Oct. 25, 1938.    E. A. BAILEY    2,134,498
REVERSIBLE THERMOSTATIC SYSTEM
Filed March 21, 1936
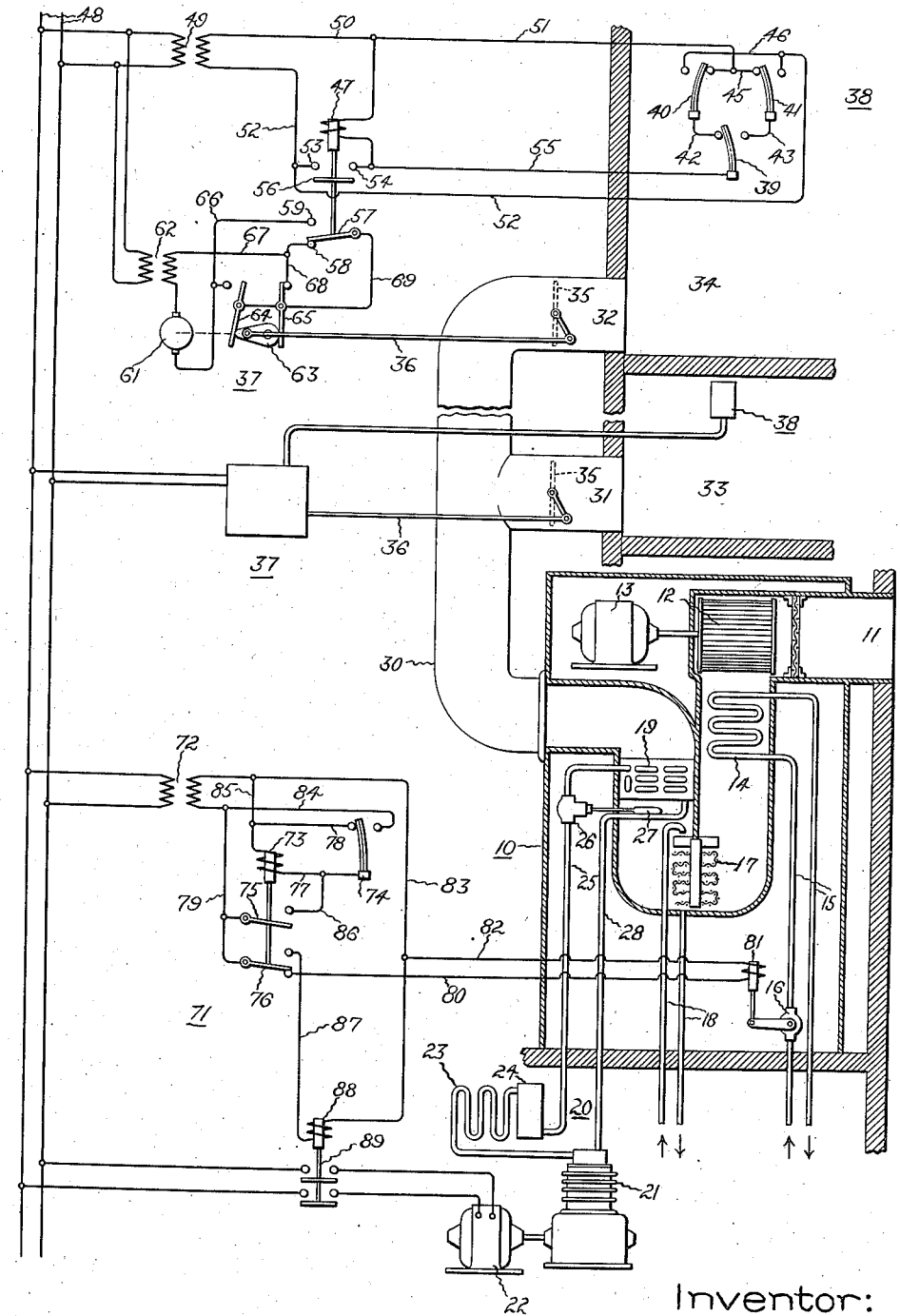
Inventor:
Edward A. Bailey,
by Harry E. Dunham
His Attorney.

Patented Oct. 25, 1938

2,134,498

UNITED STATES PATENT OFFICE 2,134,498

REVERSIBLE THERMOSTATIC SYSTEM

Edward A. Bailey, West Caldwell, N. J., assignor to General Electric Company, a corporation of New York Application March 21, 1936, Serial No. 70,099

8 Claims. (Cl. 236—1)

My invention relates to a reversible thermostatic system particularly suitable for full automatic thermostat selective heating and cooling air conditioning control service.

An object of my invention is to provide an improved thermostatic system whereby the admission of heating and cooling mediums to a conditioned space in year round air conditioning service are reversibly controlled automatically upon an increase or decrease in temperature to different predetermined values.

It has been found desirable in the interest of economy and comfort to maintain lower temperatures within conditioned spaces in winter when the space is heated and higher temperatures in summer when cooling is desired. In the past this has been accomplished by manually varying the setting of the thermostat or other thermal responsive means controlling the conditioning apparatus. Other operating disadvantages result from the use of conditioning systems utilizing a central duct through which the conditioned air is distributed to a plurality of spaces, such as rooms, through branch ducts, which are now extensively used. In these systems it is possible to permanently adjust the air flow for either even heating or even cooling, but the ratios of heating to cooling requirements are often different for the various rooms. Therefore, the admission of conditioned air into each room is regulated by a damper or some similar device positioned in the branch duct and controlled by a thermostat placed in the room. In order to open the damper in summer to admit cooled air and in winter to admit heated air, it is necessary to reverse the effect of the thermostat on the damper actuating means because during the one season the damper is to be operated to its open position on an increase in temperature and at the other season on a decrease in temperature. In my copending application, Serial No. 70,100, filed March 21, 1936, assigned to the assignee of the present application, I have disclosed an air-conditioning system of the above type in which desired reversal of the effect of the thermostat on the damper actuating means and the change in setting of the thermostat are effected automatically. The system disclosed comprises a centrally located thermostat adapted to reverse the connections of thermostats located in the respective rooms to which the conditioned medium is supplied.

It is an object of my present invention to provide an improved automatic heating and cooling system and to provide an improved and simplified reversible thermostatic system comprising a unitary, easily adjustable device.

A further object of my invention is to provide a simplified thermostatic control in which a unitary device comprising three thermal responsive means is utilized; one adapted to energize the damper operating means on a decrease in temperature, a second to energize the damper operating means on an increase in temperature and the third adapted to select one of the two first-mentioned means depending upon whether the temperature in the space being conditioned is below or above a certain predetermined value.

A more detailed understanding of the present invention may be secured from the following description taken in connection with the accompanying drawing in which is illustrated a preferred embodiment of the invention. The single figure of the drawing illustrates a schematic diagram, partially in sectional elevation, of a conditioning system embodying my invention.

The air conditioner 10 may be of any conventional type but for purposes of illustration I have chosen the well-known type utilizing a motor-driven compressor for providing refrigeration and other means for heating and humidfying the air as will be briefly described hereinafter. The conditioner is supplied with air through an inlet 11 extending without the walls of the conditioner proper. The supply of air may be either fresh air or a mixture of fresh and re-circulated air and as both methods of supplying air to the conditioner are well known to those skilled in the art I have not illustrated them. The supply of air is forced through the conditioner by means of a fan 12 driven by means of an electric motor 13. The motor may be supplied with energy from any suitable source (not shown) and may be energized constantly or intermittently as desired. The air is heated by means of a coil 14 supplied with steam from any suitable source through conduits 15, the inlet conduit being provided with a solenoid operated valve 16. After passing by the heater coil the air is humidified by any well-known humidifying means, illustrated by reference numeral 17, which may be supplied with water through conduits 18. Thereafter the air passes by an evaporator 19 forming part of the cooling system indicated generally by reference numeral 20.

The cooling system comprises a compressor 21 driven by means of an electrical motor 22 supplied with energy from any suitable source in a manner to be described hereinafter. The compressed refrigerant passes through condenser coils 23 which may be cooled in any well-known manner (cooling means not shown). The condensed refrigerant is collected in the liquid receiver 24 and from thence the liquid passes to the evaporator 19 through conduit 25 under the control of the refrigerant valve 26 which in turn is controlled by the usual thermostatic bulb 27. After passing through the evaporator 19 the gaseous refrigerant passes to the compressor 21 through a conduit 28. The conditioned air is thereafter circulated to the spaces which it is desired to condition through a central duct 30 having individual ducts 31 and 32 leading to a zone comprising a plurality of spaces, such as rooms 33 and 34, respectively.

The regulation of the flow of conditioned air to the various spaces, of which I have illustrated but two, is by means of dampers 35 positioned in each of the individual air ducts leading to the various rooms. The dampers are connected by means of eccentrically mounted linkage members 36 to actuating means indicated generally by reference numerals 37, which actuating means will be described more in detail hereinafter. The actuating means are in turn controlled by means of my improved thermostatic systems indicated generally at 38, and positioned in the spaces to be conditioned. The thermostatic system is adapted to maintain the temperature within the space within the predetermined limits of an upper range in summer and within the predetermined limits of a lower range in winter in a manner to be described.

The reversible thermostatic system positioned within the room consists of three adjustable thermal responsive means of any well-known type, which for purpose of illustration are shown as bimetallic thermostatic elements 39, 40 and 41. The first of these thermal responsive means or thermostats, as they will be referred to hereafter, may be called a selector thermostat. It is actuated from one position to another at a temperature intermediate the temperatures at which thermostats 40 and 41 are operable. Thermostat 40 is operable at a low temperature, or within a predetermined lower range, depending upon the differential of temperature required for its actuation, and 41 is similarly operable at a higher temperature or range. These temperatures or ranges thus correspond to the temperatures it is desired to keep in winter and summer, or when heating and cooling are desired respectively.

Thermostat 40 is connected to one of the contacts associated with thermostat 39 by means of connection 42 and thermostat 41 is similarly connected to the other contact associated with thermostat 39 by a connection 43. Adjacent contacts associated with thermostats 40 and 41 are interconnected by means of a connection 45. The remaining contacts associated with the last-mentioned thermostats are also interconnected by means of an electrical connection 46.

The arrangement just described is adapted to control the energization of a control device such as a relay 47 receiving energy from a suitable supply 48 through a transformer 49. The secondary winding of the latter is connected to one side of the relay through connection 50 and to the interconnected adjacent contacts of the thermostatic system by means of connection 51. The remaining terminal of the secondary winding is connected by means of conductor 52 to the other pair of interconnected contacts of the thermostatic system 38 and to contact 53, which with contact 54 forms part of a holding circuit for the relay 47. Contact 54 and one terminal of relay 47 are in turn interconnected and also connected to bimetallic element 39 by means of an electrical conductor 55. Associated with the relay is a bridging member 56, adapted to bridge contacts 53 and 54, and a second switch member 57 adapted to be moved upwardly from engagement with contact 58 into engagement with contact 59 when the relay is energized.

The damper actuating means will now be described. As previously stated, the damper 35 is connected by means of an eccentrically mounted linkage member 36 to the actuating means 37 comprising an electric motor 61 adapted to receive energy from the supply 48 through a transformer 62. The energization of motor 61 to open and close the damper is effected by means of a switch element 57 and its cooperating contacts 58 and 59 in conjunction with a limit switch mechanism comprising cam 63 and movable switch members 64 and 65. Engagement of switch member 57 with contact 59 upon energization of relay 47 completes a circuit from contact 59 through conductor 66, motor 61, secondary winding of transformer 62, conductors 67 and 68, limit switch 65 and conductor 69 to switch member 57. Motor 61 thereupon operates to open damper 35 by means of crank arm 36 while at the same time cam 63 is rotated. At the time damper 35 is in its fully open position the cam 63 is rotated 180° to open limit switch 65 and close limit switch 64, thereby deenergizing motor 61. Upon subsequent movement of switch member 57 from contact 59 to contact 58 upon deenergization of relay 47 a circuit is established from contact 58 through conductors 68 and 67, secondary winding of transformer 62, motor 61, conductor 66, limit switch 64, and conductor 69 to switch member 57, thereby energizing motor 61 to return damper 35 to its closed position. Cam 63 rotates 180° opening limit switch 64 to deenergize motor 61 and closing limit switch 65 preparatory to the next energization of relay 47.

It will be understood that other well-known forms of damper actuating means may be employed if desired. This is true, particularly if modulated control of the damper is desired and if such modulated control is deemed to be desirable, the damper operating motor and control above described may be modified in the manner shown in Letters Patent No. 1,902,327, Hall, also assigned to the assignee of the present application.

In order to selectively obtain either heating or cooling of the air passing through the conditioner I have provided a control indicated generally at 71. The control is energized through a transformer 72 connected to the main source of power 48. A relay 73 under the control of thermal responsive means 74, positioned at some point either within or without the space or zone that is conditioned whose temperature may be considered as representative of the entire space or zone, is adapted to close, upon energization, a holding circuit for itself by means of switch member 75 and to energize relays controlling the heating and cooling means by operation of a switch member 76. The thermostat 74 is arranged to move to the left in response to a decrease in temperature and is furthermore adapted to be actuated at a temperature approximately the same as that at which the selector thermostat 39 is operable. Thus, in the position indicated, the temperature is below this assumed value and, consequently, the relay 73 is deenergized as it is short circuited through conductors 77 and 78. In this position the relay 73 is adapted to close a circuit leading from the secondary winding of transformer 72 through conductor 79, switch member 76 and conductor 80 to a solenoid 81 and from thence back to the secondary winding through conductors 82 and 83. The relay 79 is thereby energized to open the valve controlling the supply of steam to the heater coil 14 of the air conditioner. If the temperature rises and the bimetallic member moves to the right into engagement with its associated right-hand contact, the relay 73 will be energized by closure of a circuit leading from the secondary of transformer 72 through conductor 84, bimetallic member 74, conductor 77, relay 73 and conductor 85 back to the secondary winding. Energization of the relay causes upward movement of its associated armature and the establishment of a holding circuit for the relay through electrical connection 86 and switch member 75. Simultaneously, switch member 76 is moved upwardly to close a circuit for the relay controlling the operation of the compressor motor 22. This circuit leads from one side of the transformer winding through electrical connections 79, switch 76, conductor 87 to the solenoid 88 and from thence back to the secondary winding through conductor 83. Upon energization of relay 88 its associated armature and switch member 89 is moved upwardly to connect compressor motor 22 directly across the supply lines 48.

The operation of my system as a whole will now be described. For purpose of illustration I shall assume that it is desirable to maintain a temperature of 72° within the spaces 33 and 34 in winter and that a temperature of 78° is desirable in summer. Therefore, temperature responsive means 40 should move to the left into engagement with its left contact at a temperature of 72° and thermostat 41 must similarly remain in contact with its left contact until a temperature of 78° obtains within the space, at which time it will move into engagement with its right-hand contact. In order to transfer the control from one thermostat to another at the temperatures given above, it is necessary then that the thermostat 39 be arranged to move from one of these contacts to another at some intermediate temperature which I have chosen to be 75°. It should be understood that, as has been stated previously, my invention is applicable equally well to systems in which the respective thermostats are operable from one control position to another within predetermined limits, such for example as one or two degrees. The operation is the same, irrespective of the temperature differential required for the actuation of the thermostats.

Similarly, it will be noted that if it is desirable to maintain a temperature of 72° indoors in winter the heating means of the air-conditioning system must be placed in operation some time prior to the time that a temperature of 72° obtains within the space and also, for the same reasons, the cooling system must be placed in operation prior to the time that the temperature within the space to be conditioned rises to 78°. For this reason thermal responsive means 74 controlling the cooling and heating means of the air conditioner may be so selected that it will operate at a temperature of 75°, that is, if the temperature is below 75° it will be in the position illustrated wherein the heating means is in operation and if the temperature is above 75°, it will move to the right and energize the relay 83 controlling the operation of the cooling means.

Assuming now that the temperature within the spaces 33 and 34 is 73° and that the temperature to which thermostat 74 is responsive is also 73°, then the various parts of the entire system will be in the position illustrated in the single figure of the drawing. Consequently, it will be seen that the dampers 35 are in their closed position due to the fact that relay 47 is deenergized and that heating medium is supplied to the conditioner due to the energization of solenoid 81. If the temperature within the space 34 decreases to a value below 72° thermostats 39 and 41 will remain in the position indicated, as will thermostat 74, but thermostat 40 will move into engagement with its left contact. An energizing circuit for relay 47 is thereby closed as follows: From one side of the transformer 49 through conductor 50, relay 47, conductor 55, thermostat 39, conductor 42, thermostat 40, conductor 46 and from thence through conductor 52 back to the transformer winding. Relay 47 is thereupon energized and it moves its associated armature upward establishing the holding circuit for itself by closure of contacts 53 and 54 by bridging member 56 in a manner that is evident from an inspection of the drawing. Simultaneously therewith, switch member 57 is moved into engagement with contact 59 effecting energization of motor 61 and causing actuation of damper 35 to its open position in a manner that has been heretofore described. Heated air is then supplied to the space 34 through ducts 30 and 32. The supply of conditioned air is continued until such time as the temperature of the space increases to a value above 72° whereupon thermostat 40 moves to the right into engagement with its right-hand contact, whereupon relay 47 is short circuited through conductor 51, interconnection 45, thermostat 40, conductor 42, thermostat 39 and conductor 55. The short circuit causes deenergization of relay 47 and the downward movement of its associated armature and switch members. Switch member 57 thereupon maintains engagement with contact 58 closing an energizing circuit for motor 61 and actuating damper 35 to its closed position in the manner heretofore described.

The above operation is repeated if the temperature within the space again falls below 72°. However, assuming that the temperature rises to a value above 75°, thermostat 39 will thereupon fall into engagement with its associated right-hand contact, but no operation of relay 47 will result because of the fact that it is short circuited through the conductors previously mentioned and through thermostat 41 which is in parallel with thermostat 40. However, the thermostat 74 controlling the operation of the heating and cooling elements of the conditioner will move into engagement with the right-hand contact and thereupon close an energizing circuit for relay 73 which is as follows: From one side of the secondary of transformer 72 through conductor 84, thermostat 74, conductor 77, relay 73 and conductor 85 back to the secondary winding. Energization of relay 73 causes upward movement of its associated switch members 75 and 76, the former closing a holding circuit for the relay 73 through conductor 79, switch member 75, and conductor 86, and the latter deenergizing solenoid 81 and energizing solenoid 88. Deenergization of solenoid 81 effects closure of steam valve 16 and energization of solenoid 88 causes the closure of its associated switch 89 energizing the compressor motor 22 and initiating operation of the cooling system.

Assuming further that the temperature increases to a value above 78°, then thermostat 41 will move to its right-hand position into engagement with its right-hand contact closing an energizing circuit for relay 47 in the manner heretofore described by the closure of the circuit by thermostat 40. Energization of relay 47 effects energization of damper motor 61 and actuation of the damper into its open position in the manner previously described. Consequently, the air conditioner supplies cooled air into the space 34 until such a time as the temperature decreases to a value below 78°. If the temperature decreases below this value the thermostat 41 moves into engagement with its left-hand contact closing a short circuit around relay 47 and causing energization of motor 61 to actuate damper 35 into its closed position. From the above description it may be seen that the single thermostatic device 38 is adapted to open the dampers in the air duct to allow the flow of conditioned air into the space in such manner that the space will be cooled when the temperature is above a predetermined limit and will be heated if the temperature decreases below another predetermined limit.

The system is adapted to various modifications and its advantages will be clearly apparent to those skilled in the art. It is obvious that various types of conditioning systems and damper operating means may be used and, in fact, that other heat exchange mediums may be used and the flow may be through various types of ducts or pipes and under the control of regulating devices such as valves. It is to be understood that my invention in its broader aspects covers these modifications.

What I claim as new and desire to secure by Letters Patent of the United States, is:

1. In combination, a control device, an energizing circuit therefor, a deenergizing circuit therefor, means including a thermal responsive device operable at a predetermined temperature for closing said energizing and deenergizing circuits on a decrease and increase in temperature, respectively, a second thermal responsive device operable at a second predetermined temperature for closing said energizing and deenergizing circuits on an increase and decrease in temperature, respectively, and means including a third thermal responsive device for selectively placing said thermostats in control of said circuits.

2. In combination, a control device, an energizing circuit therefor, a deenergizing circuit therefor, means including a thermal responsive device operable at a predetermined temperature for closing said energizing and deenergizing circuits on a decrease and increase in temperature, respectively, a second thermal responsive device operable at a second predetermined temperature for closing said energizing and deenergizing circuits on an increase and decrease in temperature, respectively, and means including a third thermal responsive device operable at a temperature intermediate said predetermined temperatures for selectively placing said thermostats in control of said circuits.

3. In combination, regulating means for controlling the flow of a heat exchange medium, means for actuating said regulating means, and means controlling the last-mentioned means for causing actuation thereof in a first direction on a variation in temperature below a predetermined limit and in the opposite direction on a variation above said predetermined limit when the temperature is below a predetermined value and in said first direction on a variation in temperature above a second limit and in the opposite direction on a variation below said second limit when the temperature is above said predetermined value, said means including a first thermal responsive means operable at said first limit, second thermal responsive means operable at said second limit, and third thermal responsive means operable at said predetermined value adapted to selectively place said first two mentioned devices in control of said actuating means.

4. In combination, a space to be conditioned, means for supplying said space with a heat exchange medium, means for heating said medium, means for cooling said medium, means for selectively placing said heating and cooling means in operation, a means for regulating the flow of said medium to said space, actuating means for said last-mentioned means, and means for controlling said actuating means in response to temperature variations within said space, said means including a control device for said actuating means, an energizing circuit for said control device, a thermal responsive device located within said space operable at a predetermined temperature to energize and deenergize said device on a decrease and increase in temperature below and above said predetermined temperature, respectively, a second thermal responsive device operable at a second predetermined temperature to energize and deenergize said device on an increase and decrease in temperature, above and below said second predetermined value, respectively, and a third thermal responsive device operable to place said first thermal responsive device in control when the temperature within said space is below a value intermediate said two first-mentioned values and to place said second thermal responsive device in control when the temperature is above said intermediate value.

5. In combination, temperature control means having an energizing circuit, three temperature responsive switches, each responsive to the temperature controlled by said means with one of said switches operable between two circuit closing positions upon opposite variations in temperature in a range intermediate two other temperature ranges and with the other two of said switches each operable to a circuit closing position one upon a decrease in temperature in the lowest of said other ranges and the other upon an increase in temperature in the highest of said other ranges, and connections separately controlled by said two switches jointly with said one switch for closing and opening said energizing circuit in the lowest of said temperature ranges on a decrease and increase in temperature respectively and in the highest of said temperature ranges on an increase and decrease in temperature respectively.

6. The combination including reversible regulating means for controlling the flow of a heat exchange medium, thermostatic means controlling said regulating means for causing actuation thereof in predetermined different directions upon variations in temperature respectively below and above a predetermined limit when the temperature is within a predetermined low range and for causing actuation thereof in the same predetermined different directions upon variations in temperature respectively above and below a second predetermined limit when the temperature is within a predetermined high range, said thermostatic means including a first thermostat operable in accordance with temperature variations below and above said first limit, a second thermostat operable in accordance with temperature variations above and below said second limit, and a third thermostat operable in accordance with variations in temperature intermediate said low and high range for selectively placing a different one of said two first mentioned thermostats in control of said regulating means.

7. In combination, a temperature controlling device having an energizing circuit, a thermostatic switch operable to and from a circuit closing position upon a decrease and increase respectively in temperature within a predetermined low temperature range, a thermostatic switch operable to and from a circuit closing position upon an increase and decrease respectively in temperature within a predetermined high temperature range, and a thermostatic switch operable between two circuit closing positions upon predetermined variations in temperature below and above a value intermediate said predetermined low and high temperature ranges and having connections for placing respectively the first and the second of said two first mentioned thermostatic switches in control of said energizing circuit upon said predetermined variations in temperature.

8. In combination, reversible means for regulating the supply of a heat exchange medium to a space, means operable for heating said medium, means operable for cooling said medium, thermostatic means for selectively placing said heating and cooling means in operation in accordance with variations in the temperature of the space respectively below and above a predetermined value, and means for reversibly operating said regulating means in each of two temperature ranges within said space, one below and the other above said predetermined value, said means including three separately operable thermostats each responsive to the temperature of said space with one of said thermostats operable between two controlling positions upon variations in temperature below and above said value and the other two thermostats responding respectively in said two temperature ranges, and connections controlled by said one thermostat for selectively placing a corresponding one of said two other thermostats in control of said regulating means upon variations in temperature below and above said value.

EDWARD A. BAILEY.